United States Patent
Fu et al.

(10) Patent No.: US 10,248,674 B2
(45) Date of Patent: Apr. 2, 2019

(54) METHOD AND APPARATUS FOR DATA QUALITY MANAGEMENT AND CONTROL

(71) Applicants: JIANGXI ELECTRIC POWER CORPORATION INFORMATION AND COMMUNICATIONS BRANCH OF STATE GRID, Nanchang, Jiangxi (CN); STATE GRID CORPORATION OF CHINA, Beijing (CN)

(72) Inventors: Pingping Fu, Jiangxi (CN); Yong Ma, Jiangxi (CN); Hanyong Hao, Beijing (CN); Yanqing Chen, Jiangxi (CN); Xuelian Chen, Jiangxi (CN)

(73) Assignees: JIANGXI ELECTRIC POWER CORPORATION INFORMATION AND COMMUNICATIONS BRANCH OF STATE GRID, Jiangxi (CN); STATE GRID CORPORATION OF CHINA, Beijing (CN)

( * ) Notice: Subject to any disclaimer, the term of this patent is extended or adjusted under 35 U.S.C. 154(b) by 257 days.

(21) Appl. No.: 15/230,308

(22) Filed: Aug. 5, 2016

(65) Prior Publication Data

US 2017/0161306 A1    Jun. 8, 2017

(30) Foreign Application Priority Data

Dec. 4, 2015  (CN) .......................... 2015 1 0889904

(51) Int. Cl.
*G06F 17/00*     (2006.01)
*G06F 17/30*     (2006.01)

(52) U.S. Cl.
CPC .. *G06F 17/30303* (2013.01); *G06F 17/30156* (2013.01); *G06F 17/30309* (2013.01)

(58) Field of Classification Search
None
See application file for complete search history.

(56) References Cited

U.S. PATENT DOCUMENTS 8,434,128 B2 *   4/2013   Kennedy ................ G06F 21/55
                                                 726/1
9,274,710 B1 *   3/2016   Oikarinen .............. G06F 3/061
(Continued)

FOREIGN PATENT DOCUMENTS

| CN | 102202073 A | 9/2011 |
| CN | 103617255 A | 3/2014 |
| CN | 105512283 A | 4/2016 |

OTHER PUBLICATIONS

International Search Report, including Written Opinion of the International Searching Authority of corresponding international PCT application No. PCT/CN2016/097717, dated Dec. 5, 2016.

*Primary Examiner* — Hung D Le
(74) *Attorney, Agent, or Firm* — J.C. Patents (57) ABSTRACT

Embodiments of the present invention provide a method and an apparatus for data quality management and control. The method includes: receiving application information transmitted by a service sub-system; resolving datasheet operation trigger information to obtain datasheet flow information; receiving user information transmitted by the service sub-system and a target datasheet transmitted by the service sub-system; if a name of the target datasheet is different from a plurality of datasheet names corresponding to the service sub-system identifier, then instructing the service sub-system to store the target datasheet into a data center; if the datasheet operation information is updating a datasheet, instructing the data center to replace datasheet contents corresponding to the datasheet name with contents of the target datasheet.

10 Claims, 3 Drawing Sheets

(56) References Cited

U.S. PATENT DOCUMENTS

| | | | | |
|---|---|---|---|---|
| 2005/0097122 | A1* | 5/2005 | Schafflutzel | G06F 17/30592 |
| 2009/0320035 | A1* | 12/2009 | Ahlgren | G06F 9/468 |
| | | | | 718/104 |
| 2011/0099095 | A1* | 4/2011 | Moore | G06Q 10/063 |
| | | | | 705/30 |
| 2013/0317785 | A1* | 11/2013 | Chainer | H05K 7/2079 |
| | | | | 703/1 |
| 2014/0297695 | A1* | 10/2014 | Dejana | G06F 17/30312 |
| | | | | 707/812 |
| 2014/0325149 | A1* | 10/2014 | Misra | G06F 3/0619 |
| | | | | 711/114 |
| 2015/0278397 | A1* | 10/2015 | Hendrickson | G06F 17/30958 |
| | | | | 707/798 |
| 2015/0339329 | A1 | 11/2015 | Bester et al. | |
| 2016/0134683 | A1* | 5/2016 | Cyran | G16H 10/60 |
| | | | | 709/203 |
| 2016/0154817 | A1* | 6/2016 | Mason, Jr. | G06F 17/30171 |
| | | | | 707/704 |
| 2016/0247243 | A1* | 8/2016 | Devin | G06Q 50/06 |
| 2017/0013045 | A1* | 1/2017 | Predmore, II | H04L 67/06 |
| 2017/0083077 | A1* | 3/2017 | Hankendi | G06F 1/3287 |
| 2017/0185628 | A1* | 6/2017 | Zakwieja | G06F 17/30174 |
| 2018/0095987 | A1* | 4/2018 | Anderson | G06F 17/30067 |

* cited by examiner

METHOD AND APPARATUS FOR DATA QUALITY MANAGEMENT AND CONTROL

CROSS-REFERENCE TO RELATED APPLICATIONS

This application claims priority to Chinese Patent Application No. 201510889904.9, filed on Dec. 4, 2015, the content of which is hereby incorporated by reference in its entirety.

TECHNICAL FIELD

Embodiments of the present invention relate to computer technologies and, in particular, to a method and an apparatus for data quality management and control.

BACKGROUND

With rapid development of enterprise informatization, a great number of data of a service application system accesses a data center, which results in rapid growth for databases and datasheets in the data center and a huge number of data resources.

In the prior art, the service application system includes a plurality of sub-systems. There is a data transmission interface between each sub-system and the data center, through which a sub-system stores data generated by itself into a tablespace allocated by the data center for the sub-system.

However, as growth rates of the databases and the datasheets become faster, and the amount of data stored by the data center becomes larger, the datasheets in the data center have the following four problems: 1) one tablespace may store datasheets generated by a plurality of sub-systems, and the datasheets are stored in the tablespace disorderly, resulting in difficulty in searching a datasheet; 2) same datasheets may be stored in a plurality of tablespaces, resulting in greater redundancy for the datasheets; 3) after a datasheet is updated, both an old version and a new version exist, resulting in inconsistency of datasheets; 4) datasheet flow is not clear.

SUMMARY

Embodiments of the present invention provide a method and an apparatus for data quality management and control, which aim at lowering difficulty in searching a datasheet, reducing redundancy of the datasheet, improving consistency of datasheets and guaranteeing a clear flow of the datasheet to achieve management and control of data quality.

An aspect of an embodiment of the present invention provides a method for data quality management and control, including:

receiving application information transmitted by a service sub-system, where the application information includes a service sub-system identifier, datasheet operation information and datasheet operation trigger information;

resolving the datasheet operation trigger information to obtain datasheet flow information;

receiving user information transmitted by the service sub-system and a target datasheet transmitted by the service sub-system;

if the datasheet operation information is adding a datasheet, then querying pieces of history information according to the service sub-system identifier to obtain a plurality of datasheet names corresponding to the service sub-system identifier; if a name of the target datasheet is different from the plurality of datasheet names, then instructing the service sub-system to store the target datasheet into a data center;

if the datasheet operation information is updating a datasheet, then querying pieces of history information according to the name of the target datasheet to obtain a datasheet name that is the same as the name of the target datasheet, and instructing the data center to replace datasheet contents corresponding to the datasheet name with contents of the target datasheet;

where the pieces of history information at least comprise the service sub-system identifier and the datasheet name Another aspect of an embodiment of the present invention provides an apparatus for data quality management and control, including:

a receiving module, configured to receive application information transmitted by a service sub-system, where the application information includes a service sub-system identifier, datasheet operation information and datasheet operation trigger information; receive user information transmitted by the service sub-system and a target datasheet transmitted by the service sub-system;

a resolving module, configured to resolve the datasheet operation trigger information to obtain datasheet flow information;

a querying module, configured to: if the datasheet operation information is adding a datasheet, then query pieces of history information according to the service sub-system identifier to obtain a plurality of datasheet names corresponding to the service sub-system identifier; if the datasheet operation information is updating a datasheet, then query pieces of history information according to a name of the target datasheet to obtain a datasheet name that is the same as the name of the target datasheet; and a transmitting module, configured to: if the name of the target datasheet is different from the plurality of datasheet names, then instruct the service sub-system to store the target datasheet into a data center; and instruct the data center to replace datasheet contents corresponding to the datasheet name with contents of the target datasheet;

where the pieces of history information at least comprise the service sub-system identifier and the datasheet name According to a method and an apparatus for data quality management and control provided in embodiments of the present invention, a target datasheet may be found through a datasheet name in history information stored by a system for data quality management and control; redundancy of datasheets is reduced by querying pieces of history information to obtain a plurality of datasheet names corresponding to a service sub-system identifier, and determining whether a name of the target datasheet is the same as the plurality of datasheet names, instructing a service sub-system to store the target datasheet into a data center only when the name of the target datasheet is different from the plurality of datasheet names; consistency of the datasheets is improved by querying pieces of history information to obtain a datasheet name that is the same as the name of the target datasheet, and replacing datasheet contents corresponding to the datasheet name with contents of the target datasheet; and flow of the datasheet is guaranteed to be clear by resolving datasheet operation trigger information to obtain datasheet flow information; thus, management and control of data quality are achieved.

DESCRIPTION OF EMBODIMENTS

Figure 1:
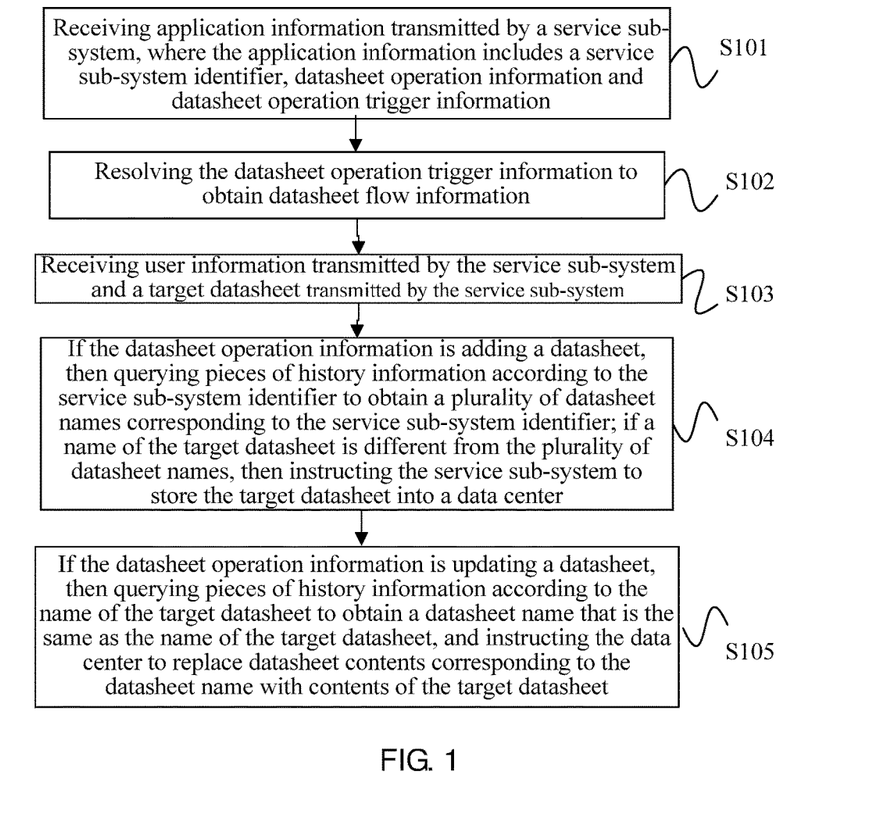
FIG. 1 is a flow chart of a method for data quality management and control according to an embodiment of the present invention.
Figure 2:
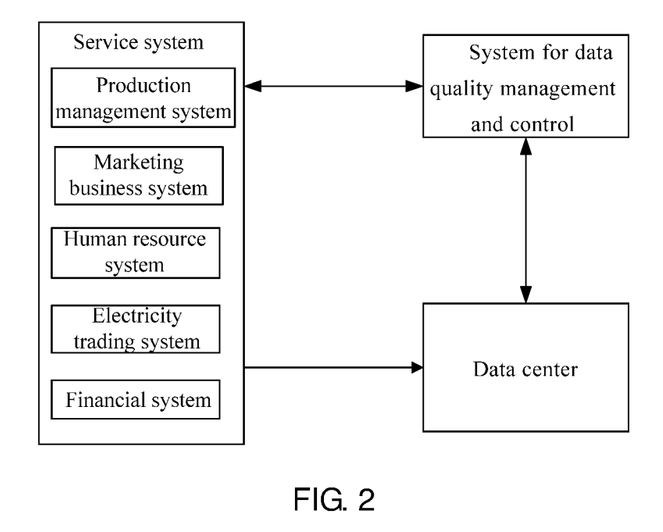
FIG. 2 is a network structural diagram applicable to a method for data quality management and control according to an embodiment of the present invention.

FIG. 1 is a flow chart of a method for data quality management and control according to an embodiment of the present invention; FIG. 2 is a network structural diagram applicable to a method for data quality management and control according to an embodiment of the present invention. An embodiment of the present invention provides a method for data quality management and control, targeting at several problems occurring in data of a data center due to faster growth rates of databases and datasheets and larger amount of data stored by the data center, where the method has the following specific steps.

Step S101, receiving application information transmitted by a service sub-system, where the application information includes a service sub-system identifier, datasheet operation information and datasheet operation trigger information;

An executive agent of embodiments of the present invention is a system for data quality management and control, as shown in FIG. 2, the system for data quality management and control may perform information interactions with a plurality of service sub-systems in a service system, and may also perform information interactions with a data center. The data center is used to store a database and/or a datasheet generated by the service sub-system. The service system includes a plurality of service sub-systems, such as a production management system, a marketing business system, a human resource system, an electricity trading system, a financial system, etc.; each service sub-system has a plurality of users correspondingly, and each user may generate a database or a datasheet in the service sub-system; when a user generates a database or a datasheet in the service sub-system, the service sub-system transmits application information to the system for data quality management and control, where the application information includes a service sub-system identifier, datasheet operation information and datasheet operation trigger information; one database includes a plurality of datasheets, and the service sub-system identifier uniquely identifies one service sub-system; the datasheet operation information indicates an operation performed by a user for a database or a datasheet generated by itself, such as introducing a datasheet, updating a datasheet, deleting a datasheet, etc.; and the datasheet operation trigger information indicates a reason why the user performs the above-described operation for the database or the datasheet.

Step S102, resolving the datasheet operation trigger information to obtain datasheet flow information;

The system for data quality management and control resolves the reason why the user performs the above-described operation for the database or the datasheet so as to obtain datasheet flow information, where the datasheet flow information specifically indicates a datasheet generated by the user is viewed, called or stored by which service sub-system, that is, the datasheet flow information may view, call or store the service sub-system identifier of the datasheet.

Step S103, receiving user information transmitted by the service sub-system and a target datasheet transmitted by the service sub-system;

The system for data quality management and control reviews the application information transmitted by the service sub-system, after the review passes, the service sub-system transmits user information and a target datasheet to the system for data quality management and control; the target datasheet is a datasheet generated by a user corresponding to the user information in the service sub-system.

Step S104, if the datasheet operation information is adding a datasheet, then querying pieces of history information according to the service sub-system identifier to obtain a plurality of datasheet names corresponding to the service sub-system identifier; if a name of the target datasheet is different from the plurality of datasheet names, then instructing the service sub-system to store the target datasheet into a data center;

If the target datasheet is a newly-added datasheet, that is, the target datasheet has not been stored in the data center, then the system for data quality management and control queries pieces of history information according to the service sub-system identifier to obtain a plurality of datasheet names corresponding to the service sub-system identifier; the system for data quality management and control is pre-stored with pieces of history information, each piece of history information at least includes the service sub-system identifier and the datasheet name; the system for data quality management and control determines whether a name of the target datasheet is the same as each datasheet name in the plurality of datasheet names respectively, if the name of the target datasheet is different from the plurality of datasheet names, then the system for data quality management and control instructs the service sub-system to store the target datasheet into the data center; if the name of the target datasheet is the same as any one of the plurality of datasheet names, then transmit warning information to the service sub-system, and notify the user of a repetition of the name of the target datasheet to avoid a repetition of datasheets in the data center.

Step S105, if the datasheet operation information is updating a datasheet, then querying pieces of history information according to the name of the target datasheet to obtain a datasheet name that is the same as the name of the target datasheet, and instructing the data center to replace datasheet contents corresponding to the datasheet name with contents of the target datasheet;

where the pieces of history information at least comprise the service sub-system identifier and the datasheet name If the target datasheet is an updated datasheet, that is, the target datasheet has been stored in the data center, the data center is stored with a datasheet having a name that is the same as that of the target datasheet, and history information pre-stored by the system for data quality management and control also includes the datasheet name, then the system for data quality management and control queries pieces of history information according to the name of the target datasheet to obtain a datasheet name that is the same as the name of the target datasheet, and instructs the data center to replace datasheet contents corresponding to the datasheet name with contents of the target datasheet, thereby avoiding a phenomenon where there is inconsistency of datasheets stored in the data center.

According to the embodiment of the present invention, a target datasheet may be found through a datasheet name in history information stored by a system for data quality management and control; redundancy of datasheets is reduced by querying pieces of history information to obtain a plurality of datasheet names corresponding to a service sub-system identifier, and determining whether a name of the target datasheet is the same as the plurality of datasheet names, instructing a service sub-system to store the target datasheet into a data center only when the name of the target datasheet is different from the plurality of datasheet names; consistency of the datasheets is improved by querying pieces of history information to obtain a datasheet name that is the same as the name of the target datasheet, and replacing datasheet contents corresponding to the datasheet name with contents of the target datasheet; and flow of the datasheet is guaranteed to be clear by resolving datasheet operation trigger information to obtain datasheet flow information; thus, management and control of data quality are achieved.

Based on the above embodiment, after the instructing the service sub-system to store the target datasheet into the data center, further including: receiving a name of a tablespace storing the target datasheet as transmitted by the data center and an interface mode between the service sub-system and the data center transmitted by the data center; and generating current record information, where the current record information includes the service sub-system identifier, the name of the tablespace, the name of the target datasheet, the user information, the datasheet flow information, operation authorization information of the target datasheet and the interface mode.

After the system for data quality management and control instructs the service sub-system to store the target datasheet into the data center, the service sub-subsystem transmits the target datasheet to the data center through an interface mode between the service sub-system and the data center, where the interface mode specifically includes any one of data warehousing technologies (Extract Transform Load, ETL for short), OGG, DBlink and Webservice. The data center may open up a tablespace for several service sub-systems, preferably, the data center opens up a tablespace for each service sub-system, the data center stores into the tablespace a target datasheet transmitted by the service sub-system through the interface mode, and transmits a name of the tablespace and the interface mode between the service sub-system and the data center to the system for data quality management and control.

The system for data quality management and control generates current record information according to the application information, the user information and the target datasheet which are transmitted by the service sub-system, the name of the tablespace and the interface mode which are transmitted by the data center as described in the above embodiment, where the current record information includes the service sub-system identifier, the name of the tablespace, the name of the target datasheet, the user information, the datasheet flow information, operation authorization information of the target datasheet and the interface mode, and the operation authorization information of the target datasheet is an authority set by the system for data quality management and control for the user for operating the target datasheet. When the system for data quality management and control receives application information transmitted by another service sub-system, the current record information then becomes history information.

After the receiving the user information transmitted by the service sub-system and the target datasheet transmitted by the service sub-system, further including: determining whether data in the target datasheet is in conformity with a preset data rule; if the data in the target datasheet is not in conformity with the preset data rule, then transmitting warning information to the service sub-system to enable a user to modify a data format in the target datasheet.

The system for data quality management and control is pre-stored with a data rule, data in target datasheets transmitted by each service sub-system should be in conformity with the data rule, that is, unified standardization is performed through the data rule to the data in the target datasheets transmitted by each service sub-system, so that the target datasheets transmitted by each service sub-system may be identified by other service sub-systems, specifically, after receiving the user information transmitted by the service sub-system and the target datasheet transmitted by the service sub-system, the system for data quality management and control determines whether data in the target datasheet is in conformity with a preset data rule; if the data in the target datasheet is not in conformity with the preset data rule, then transmit warning information to the service sub-system to enable a user to modify a data format in the target datasheet.

According to the embodiment of the present invention, unified standardization is performed to data in target datasheets transmitted by each service sub-system through a data rule pre-stored in the system for data quality management and control, which ensures that the target datasheets transmitted by each service sub-system can be identified by other service sub-systems.

Based on the above-described embodiment, after the generating the current record information, further including: analyzing an importance degree of each datasheet according to the current record information and the pieces of history information, the more the datasheet flow information corresponding to the datasheet name, the higher the importance degree of the datasheet.

Each time a piece of current record information is generated, the system for data quality management and control puts the current record information into a record information library, an importance degree of each datasheet may be obtained by analyzing all pieces of record information in the record information library, and the importance degree of each datasheet may be measured through quantity of datasheet flow information corresponding to counted datasheet names, for instance, if a name of a target datasheet occurs in pieces of record information, it is obtained from analysis of the pieces of record information that the target datasheet is viewed, called or stored by a plurality of service sub-systems, then it indicates that the target datasheet has higher importance degree, and the quantity of the datasheet flow information corresponding to the datasheet names is proportional to the importance degree of the datasheet.

The method for data quality management and control also includes: setting a datasheet collecting rule, and collecting a plurality of datasheets from the data center according to the datasheet collecting rule; determining whether names of any two datasheets in the plurality of the datasheets are the same, if the names of the two datasheets are the same, then determining whether contents of the two datasheets are the same; if the contents of the two datasheets are the same, then transmitting a first deleting command to the data center to enable the data center to delete any one of the two datasheets; if the contents of the two datasheets are different, then acquiring timestamps of the two datasheets from the data center, and transmitting a second deleting command to the data center to enable the data center to delete a datasheet having a smaller timestamp in the two datasheets.

The system for data quality management and control may also set a datasheet collecting rule, where the datasheet collecting rule includes periodic collecting, event triggered collecting, datasheet feature-based collecting, preset time point collecting, etc. The system for data quality management and control collects a plurality of datasheets from the data center according to the datasheet collecting rule, and determines whether names of any two datasheets in the plurality of datasheets are the same, if the names of the two datasheets are the same, then determine whether contents of the two datasheets are the same; if the contents of the two datasheets are the same, then transmit a first deleting command to the data center to enable the data center to delete any one of the two datasheets, thereby further reducing the redundancy of the datasheets in the data center; if the contents of the two datasheets are different, then acquire timestamps of the two datasheets from the data center, and transmit a second deleting command to the data center to enable the data center to delete a datasheet having a smaller timestamp in the two datasheets, thereby further increasing the consistency of the datasheets in the data center.

According to the embodiment of the present invention, through the system for data quality management and control, a plurality of datasheets in the data center is collected, and names and contents of any two datasheets in the plurality of datasheets are determined; the redundancy of the datasheets in the data center is further reduced by deleting any one of two datasheets having same names and same contents; and meanwhile the consistency of the datasheets in the data center is further improved by deleting a datasheet having a smaller timestamp in the two datasheets having the same names but different contents.

Figure 3:
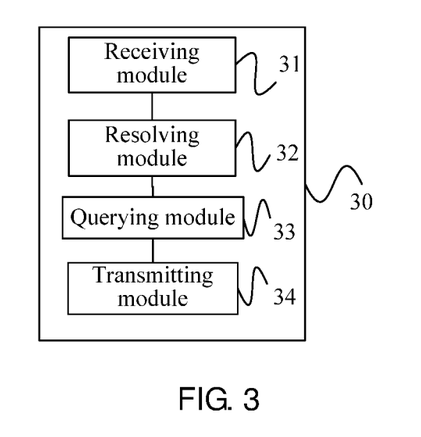
FIG. 3 is a structural diagram of an apparatus for data quality management and control according to an embodiment of the present invention.

FIG. 3 is a structural diagram of an apparatus for data quality management and control according to an embodiment of the present invention. The apparatus for data quality management and control as shown in FIG. 3 is specifically the system for data quality management and control as shown in FIG. 2. The apparatus for data quality management and control according to the embodiment of the present invention may perform processing flows according to embodiments of the method for data quality management and control, as shown in FIG. 3, the apparatus 30 for data quality management and control includes: a receiving module 31, a resolving module 32, a querying module 33 and a transmitting module 34. The receiving module 31 is configured to receive application information transmitted by a service sub-system, where the application information includes a service sub-system identifier, datasheet operation information and datasheet operation trigger information; and receive user information transmitted by the service sub-system and a target datasheet transmitted by the service sub-system. The resolving module 32 is configured to resolve the datasheet operation trigger information to obtain datasheet flow information. The querying module 33 is configured to: if the datasheet operation information is adding a datasheet, then query pieces of history information according to the service sub-system identifier to obtain a plurality of datasheet names corresponding to the service sub-system identifier; if the datasheet operation information is updating a datasheet, then query pieces of history information according to a name of the target datasheet to obtain a datasheet name that is the same as the name of the target datasheet. The transmitting module 34 is configured to: if the name of the target datasheet is different from the plurality of datasheet names, then instruct the service sub-system to store the target datasheet into a data center; and instruct the data center to replace datasheet contents corresponding to the datasheet name with contents of the target datasheet, where the pieces of history information at least include the service sub-system identifier and the datasheet name.

According to the embodiment of the present invention, a target datasheet may be found through a datasheet name in history information stored by a system for data quality management and control; redundancy of datasheets is reduced by querying pieces of history information to obtain a plurality of datasheet names corresponding to a service sub-system identifier, and determining whether a name of the target datasheet is the same as the plurality of datasheet names, instructing a service sub-system to store the target datasheet into a data center only when the name of the target datasheet is different from the plurality of datasheet names; consistency of the datasheets is improved by querying pieces of history information to obtain a datasheet name that is the same as the name of the target datasheet, and replacing datasheet contents corresponding to the datasheet name with contents of the target datasheet; and flow of the datasheet is guaranteed to be clear by resolving datasheet operation trigger information to obtain datasheet flow information; thus, management and control of data quality are achieved.

Figure 4:
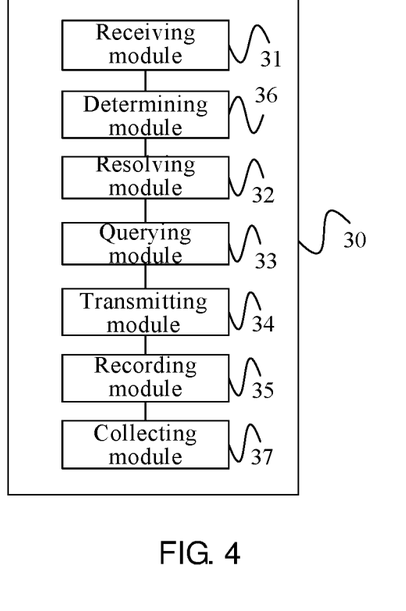
FIG. 4 is a structural diagram of an apparatus for data quality management and control according to another embodiment of the present invention.

FIG. 4 is a structural diagram of an apparatus for data quality management and control according to another embodiment of the present invention. Based on the above-described embodiment, the receiving module 31 is further configured to, after the transmitting module 34 instructs the service sub-system to store the target datasheet into the data center, receive a name of a tablespace storing the target datasheet as transmitted by the data center and an interface mode between the service sub-system and the data center transmitted by the data center; the apparatus 30 for data quality management and control also includes a recording module 35. The recording module 35 is configured to generate current record information, where the current record information includes the service sub-system identifier, the name of the tablespace, the name of the target datasheet, the user information, the datasheet flow information, operation authorization information of the target datasheet and the interface mode.

The apparatus 30 for data quality management and control also includes a determining module 36. The determining module 36 is configured to: after the receiving module 31 receives the user information transmitted by the service sub-system and the target datasheet transmitted by the service sub-system, determine whether data in the target datasheet is in conformity with a preset data rule; the transmitting module 34 is further configured to: if the data in the target datasheet is not in conformity with the preset data rule, then transmit warning information to the service sub-system to enable a user to modify a data format in the target datasheet.

The determining module 36 is further configured to analyze an importance degree of each datasheet according to the current record information and the pieces of history information, the more the datasheet flow information corresponding to the datasheet name, the higher the importance degree of the datasheet.

The apparatus 30 for data quality management and control also includes a collecting module 37. The collecting module 37 is configured to set a datasheet collecting rule, and collect a plurality of datasheets from the data center according to the datasheet collecting rule; the determining module 36 is further configured to determine whether names of any two datasheets in the plurality of the datasheets are the same, if the names of the two datasheets are the same, then determine whether contents of the two datasheets are the same; the transmitting module 34 is further configured to: if the contents of the two datasheets are the same, then transmit a first deleting command to the data center to enable the data center to delete any one of the two datasheets; if the contents of the two datasheets are different, then acquire timestamps of the two datasheets from the data center, and transmit a second deleting command to the data center to enable the data center to delete a datasheet having a smaller timestamp in the two datasheets.

The apparatus for data quality management and control according to the embodiment of the present invention may be specifically used to perform the method embodiments provided in FIG. 1 above, and specific functions will not be repeated herein.

According to the embodiment of the present invention, unified standardization is performed to data in target datasheets transmitted by each service sub-system through a data rule pre-stored in the system for data quality management and control, which ensures that the target datasheets transmitted by each service sub-system can be identified by other service sub-systems; through the system for data quality management and control, a plurality of datasheets in the data center is collected, and names and contents of any two datasheets in the plurality of datasheets are determined; the redundancy of the datasheets in the data center is further reduced by deleting any one of two datasheets having same names and same contents; and meanwhile the consistency of the datasheets in the data center is further improved by deleting a datasheet having a smaller timestamp in the two datasheets having the same names but different contents.

In conclusion, according to embodiments of the present invention, a target datasheet may be found through a datasheet name in history information stored by a system for data quality management and control; redundancy of datasheets is reduced by querying pieces of history information to obtain a plurality of datasheet names corresponding to a service sub-system identifier, and determining whether a name of the target datasheet is the same as the plurality of datasheet names, instructing a service sub-system to store the target datasheet into a data center only when the name of the target datasheet is different from the plurality of datasheet names; consistency of the datasheets is improved by querying pieces of history information to obtain a datasheet name that is the same as the name of the target datasheet, and replacing datasheet contents corresponding to the datasheet name with contents of the target datasheet; and flow of the datasheet is guaranteed to be clear by resolving datasheet operation trigger information to obtain datasheet flow information; thus, management and control of data quality are achieved; unified standardization is performed to data in target datasheets transmitted by each service sub-system through a data rule pre-stored in the system for data quality management and control, which ensures that the target datasheets transmitted by each service sub-system can be identified by other service sub-systems; through the system for data quality management and control, a plurality of datasheets in the data center is collected, and names and contents of any two datasheets in the plurality of datasheets are determined; the redundancy of the datasheets in the data center is further reduced by deleting any one of two datasheets having same names and same contents; and meanwhile the consistency of the datasheets in the data center is further improved by deleting a datasheet having a smaller timestamp in the two datasheets having the same names but different contents.

In embodiments provided in the present invention, it should be understood that the disclosed apparatus and method may be implemented in other manners. For example, the above-described apparatus embodiments are merely exemplary. For example, the unit division is merely logical function division and there may be other divisions during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a hardware plus software functional unit.

The integrated unit implemented in the form of the software functional unit as described above may be stored in a computer-readable storage medium. The software functional unit described above is stored in a storage medium, and includes several instructions capable of enabling a computer device (which may be a personal computer, a server, a network device, or the like) or a processor to perform a part of the steps of the methods described in the embodiments of the present invention. The foregoing storage medium includes: any medium that can store program codes, such as a USB flash disk, a mobile hard disk, a read-only memory (Read-Only Memory, ROM), a random access memory (Random Access Memory, RAM), a magnetic disk, or an optical disc.

Persons of ordinary skill in the art may clearly understand that, for the purpose of convenient and brief description, the division of the above functional modules is merely described for exemplary purposes, during practical use, the above functions may be assigned to different functional modules as required, that is, an internal structure of the apparatus is divided into different functional modules to perform all or a part of functions as described above. For a specific operating process of the above apparatus, reference may be made to corresponding procedures in the foregoing method embodiments, which will not be repeated herein.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for data quality management and control, comprising:

receiving, by a system for data quality management and control, application information transmitted by a service sub-system, wherein the application information comprises a service sub-system identifier, datasheet operation information and datasheet operation trigger information;

resolving, by the system, the datasheet operation trigger information to obtain datasheet flow information;

receiving, by the system, user information transmitted by the service sub-system and a target datasheet transmitted by the service sub-system;

if the datasheet operation information is adding a datasheet, then querying, by the system, pieces of history information according to the service sub-system identifier to obtain a plurality of datasheet names corresponding to the service sub-system identifier; if a name of the target datasheet is different from the plurality of datasheet names, then instructing, by the system, the service sub-system to store the target datasheet into a data center;

if the datasheet operation information is updating a datasheet, then querying, by the system, pieces of history information according to the name of the target datasheet to obtain a datasheet name that is the same as the name of the target datasheet, and instructing, by the system, the data center to replace datasheet contents corresponding to the datasheet name with contents of the target datasheet;

wherein the pieces of history information at least comprise the service sub-system identifier and the datasheet name.

2. The method according to claim 1, after the instructing, by the system, the service sub-system to store the target datasheet into the data center, further comprising:

receiving, by the system, a name of a tablespace storing the target datasheet as transmitted by the data center and an interface mode between the service sub-system and the data center transmitted by the data center; and generating, by the system, current record information, wherein the current record information comprises the service sub-system identifier, the name of the tablespace, the name of the target datasheet, the user information, the datasheet flow information, operation authorization information of the target datasheet and the interface mode.

3. The method according to claim 2, after the receiving, by the system, the user information transmitted by the service sub-system and the target datasheet transmitted by the service sub-system, further comprising:

determining, by the system, whether data in the target datasheet is in conformity with a preset data rule;

if the data in the target datasheet is not in conformity with the preset data rule, then transmitting, by the system, warning information to the service sub-system to enable a user to modify a data format in the target datasheet.

4. The method according to claim 3, after the generating, by the system, the current record information, further comprising:

analyzing, by the system, an importance degree of each datasheet according to the current record information and the pieces of history information, the more the datasheet flow information corresponding to the datasheet name, the higher the importance degree of the datasheet.

5. The method according to claim 4, further comprising:

setting, by the system, a datasheet collecting rule, and collecting by the system, a plurality of datasheets from the data center according to the datasheet collecting rule;

determining, by the system, whether names of any two datasheets in the plurality of the datasheets are the same, if the names of the two datasheets are the same, then determining, by the system, whether contents of the two datasheets are the same;

if the contents of the two datasheets are the same, then transmitting, by the system, a first deleting command to the data center to enable the data center to delete any one of the two datasheets;

if the contents of the two datasheets are different, then acquiring, by the system, timestamps of the two datasheets from the data center, and transmitting, by the system, a second deleting command to the data center to enable the data center to delete a datasheet having a smaller timestamp in the two datasheets.

6. An apparatus for data quality management and control, comprising:

a processor; and a computer-readable medium for storing program codes, which, when executed by the processor, cause the processor to:

receive application information transmitted by a service sub-system, wherein the application information comprises a service sub-system identifier, datasheet operation information and datasheet operation trigger information; receive user information transmitted by the service sub-system and a target datasheet transmitted by the service sub-system;

resolve the datasheet operation trigger information to obtain datasheet flow information;

if the datasheet operation information is adding a datasheet, then query pieces of history information according to the service sub-system identifier to obtain a plurality of datasheet names corresponding to the service sub-system identifier; if the datasheet operation information is updating a datasheet, then query pieces of history information according to a name of the target datasheet to obtain a datasheet name that is the same as the name of the target datasheet; and if the name of the target datasheet is different from the plurality of datasheet names, then instruct the service sub-system to store the target datasheet into a data center; and instruct the data center to replace datasheet contents corresponding to the datasheet name with contents of the target datasheet;

wherein the pieces of history information at least comprise the service sub-system identifier and the datasheet name.

7. The apparatus for data quality management and control according to claim 6, wherein the program codes further cause the processor to: after instruct the service sub-system to store the target datasheet into the data center, receive a name of a tablespace storing the target datasheet as transmitted by the data center and an interface mode between the service sub-system and the data center transmitted by the data center;

the program codes further cause the processor to: generate current record information, wherein the current record information comprises the service sub-system identifier, the name of the tablespace, the name of the target datasheet, the user information, the datasheet flow information, operation authorization information of the target datasheet and the interface mode.

8. The apparatus for data quality management and control according to claim 7, wherein the program codes further cause the processor to:
after receive the user information transmitted by the service sub-system and the target datasheet transmitted by the service sub-system, determine whether data in the target datasheet is in conformity with a preset data rule;
if the data in the target datasheet is not in conformity with the preset data rule, then transmit warning information to the service sub-system to enable a user to modify a data format in the target datasheet.

9. The apparatus for data quality management and control according to claim 8, wherein, the program codes further cause the processor to: analyze an importance degree of each datasheet according to the current record information and the pieces of history information, the more the datasheet flow information corresponding to the datasheet name, the higher the importance degree of the datasheet.

10. The apparatus for data quality management and control according to claim 9, wherein the program codes further cause the processor to:
set a datasheet collecting rule, and collect a plurality of datasheets from the data center according to the datasheet collecting rule;
determine whether names of any two datasheets in the plurality of the datasheets are the same, if the names of the two datasheets are the same, then determine whether contents of the two datasheets are the same;
if the contents of the two datasheets are the same, then transmit a first deleting command to the data center to enable the data center to delete any one of the two datasheets; if the contents of the two datasheets are different, then acquire timestamps of the two datasheets from the data center, and transmit a second deleting command to the data center to enable the data center to delete a datasheet having a smaller timestamp in the two datasheets.

\* \* \* \* \*